(12) United States Patent
Gider et al.

(10) Patent No.: US 7,538,977 B2
(45) Date of Patent: May 26, 2009

(54) METHOD AND APPARATUS FOR PROVIDING DIAMAGNETIC FLUX FOCUSING IN A STORAGE DEVICE

(75) Inventors: Savas Gider, San Jose, CA (US); Wen-chien David Hsiao, San Jose, CA (US)

(73) Assignee: Hitachi Global Storage Technologies B.V., Amsterdam (NL)

( * ) Notice: Subject to any disclaimer, the term of this patent is extended or adjusted under 35 U.S.C. 154(b) by 330 days.

(21) Appl. No.: 10/837,279

(22) Filed: Apr. 30, 2004

(65) Prior Publication Data

US 2005/0243462 A1 Nov. 3, 2005

(51) Int. Cl.
*G11B 5/187* (2006.01)
*G11B 5/31* (2006.01)

(52) U.S. Cl. ............................ 360/125.71; 360/119.01; 360/128

(58) Field of Classification Search ................. 360/125, 360/126, 119, 120, 119.01–119.13, 125.3, 360/125.71, 128, FOR. 219
See application file for complete search history.

(56) References Cited

U.S. PATENT DOCUMENTS

| | | | | |
|---|---|---|---|---|
| 4,052,749 A | * | 10/1977 | Nomura et al. | 360/123 |
| 4,503,440 A | * | 3/1985 | Springer | 346/74.5 |
| 5,609,948 A | | 3/1997 | David et al. | |
| 5,644,455 A | | 7/1997 | Schultz | |
| 5,802,700 A | | 9/1998 | Chen et al. | |
| 5,850,326 A | | 12/1998 | Takano et al. | |
| 5,978,174 A | * | 11/1999 | Sullivan | 360/97.01 |
| 6,031,696 A | | 2/2000 | Yamanaka | |
| 6,072,670 A | | 6/2000 | Furuichi et al. | |
| 6,104,574 A | | 8/2000 | Takano et al. | |
| 6,209,192 B1 | | 4/2001 | Urai et al. | |
| 6,320,725 B1 | * | 11/2001 | Payne et al. | 360/125 |
| 6,330,743 B1 | | 12/2001 | Iijima et al. | |
| 6,818,960 B2 | * | 11/2004 | Nagai | 257/421 |
| 2003/0128465 A1 | * | 7/2003 | Sasaki | 360/126 |

FOREIGN PATENT DOCUMENTS

| | | | | |
|---|---|---|---|---|
| GB | 2122949 A | * | 1/1984 | |
| JP | 57055523 A | * | 4/1982 | |
| JP | 57203218 | | 12/1982 | |
| JP | 01125709 A | * | 5/1989 | |
| JP | 1146112 | | 6/1989 | |
| JP | 01189004 A | * | 7/1989 | |
| JP | 01204202 A | * | 8/1989 | |

(Continued)

OTHER PUBLICATIONS

USPTO STIC Library English-language translation of "Magnetic Head," Toshio Uehara and Shigeru Kobayashi, JP Document No. 06-44522.*

(Continued)

*Primary Examiner*—William J Klimowicz
(74) *Attorney, Agent, or Firm*—Merchant & Gould

(57) ABSTRACT

A method and apparatus for providing improved flux focusing in a write head is disclosed. The present invention uses a diamagnetic material to provide flux focusing in a storage device. An embodiment of the present invention includes diamagnetic material having a magnetic susceptibility substantially equal to or greater than $1\times10^{-5}$. Another embodiment of the present invention includes diamagnetic material selected from a group comprising graphite and bismuth.

17 Claims, 6 Drawing Sheets

FOREIGN PATENT DOCUMENTS

| | | | |
|---|---|---|---|
| JP | 01224910 A | * | 9/1989 |
| JP | 01307906 A | * | 12/1989 |
| JP | 2105307 | | 4/1990 |
| JP | 03088114 A | * | 4/1991 |
| JP | 03201209 A | * | 9/1991 |
| JP | 04023218 A | * | 1/1992 |
| JP | 04263106 A | * | 9/1992 |
| JP | 05166166 A | * | 7/1993 |
| JP | 053747009 A | * | 12/1993 |
| JP | 06044522 A | * | 2/1994 |
| JP | 06131632 A | * | 5/1994 |
| JP | 06180818 A | * | 6/1994 |
| JP | 11120512 | | 4/1999 |

OTHER PUBLICATIONS

CV Raman, F.R.S., "Diamagnetism and molecular structure," lecture delivered on Nov. 8, 1929, published 1930, Proc. Phys. Soc. 42 309-320 (1930).*

J. W. McClure, "Energy Band Structure of Graphite," Jul. 1964, IBM Journal, pp. 255-261.*

M.D. Simon et al. "Diamagnetic levitation: Flying frogs and floating magnets (invited)," May 2000, Journal of Applied Physics, pp. 6200-6204.*

English Translation of JP 01-125709 A to Iketani et al., published on May 18, 1989.*

"Diamagnetic, Paramagnetic, and Ferromegnetic Materials," NDT Resource Center, pp. 1-2., www.ndt-et.org.

* cited by examiner

METHOD AND APPARATUS FOR PROVIDING DIAMAGNETIC FLUX FOCUSING IN A STORAGE DEVICE

BACKGROUND OF THE INVENTION

1. Field of the Invention

This disclosure relates in general to magnetic storage systems, and more particularly to a method and apparatus for providing diamagnetic flux focusing in a storage device.

2. Description of Related Art

There has been huge progress in the field of magnetic storage system technology in almost 50 years. Moreover, the rate of this progress is increasing year after year. Such success has made storage systems an important component of modern computers.

Some of the most important customer attributes of any storage system are the cost per megabyte, data rate, and access time. In order to obtain the relatively low cost of today's storage system compared to solid state memory, the customer must accept the less desirable features of this technology, which include a relatively slow response, high power consumption, noise, and the poorer reliability attributes associated with any mechanical system. On the other hand, magnetic storage systems have always been nonvolatile; i.e., no power is required to preserve the data, an attribute which in semiconductor devices often requires compromises in processing complexity, power-supply requirements, writing data rate, or cost.

Improvements in areal density have been the chief driving force behind the historic improvement in storage cost. In fact, the areal density of magnetic storage systems continues to increase. While nature allows us to scale down the size of each bit of information, it does not allow scaling to happen forever.

Today, as the magnetic particles that make up recorded data on a storage system become ever smaller, technical difficulties in writing and reading such small bits occur. Further, as areal density increases, the requirements put on head designs will change.

In a magnetic head, a read element and a write element are formed having an air bearing surface ABS, in a plane, which can be aligned to face the surface of the magnetic disk. The read element includes a first shield, a second shield, and a read sensor that is located within a dielectric medium between the first shield and the second shield. The most common type of read sensor used in the read/write head is the magnetoresistive (AMR or GMR) sensor, which is used to detect magnetic field signal changes in a magnetic medium by means of changes in the resistance of the read sensor imparted from the changing magnitude and direction of the magnetic field being sensed.

The write element is typically an inductive write element that includes the second shield that functions as a first pole for the write element and a second pole disposed above the first pole. The first pole and the second pole contact one another at a backgap portion, with these three elements collectively forming the yoke. The combination of a first pole tip portion and a second pole tip portion near the ABS are sometimes referred to as the ABS end of the write element. Some write elements have included a pedestal that can be used to help define track width and throat height. A write gap is formed between the first and second poles in the area opposite the back gap portion. The write gap is typically filled with a non-magnetic, electrically insulating material that forms a write gap material layer. A conductive coil passes through the yoke. The write head operates by passing a writing current through the conductive coil. Because of the magnetic properties of the yoke, a magnetic flux is induced in the first and second poles by write currents passed through the coil. The write gap allows the magnetic flux to fringe out from the yoke thus forming a fringing gap field and to cross the magnetic recording medium that is placed near the ABS.

Areal density, also sometimes called bit density, refers to the amount of data that can be stored in a given amount of hard disk platter "real estate". Since disk platters surfaces are of course two-dimensional, areal density is a measure of the number of bits that can be stored in a unit of area. It is usually expressed in bits per square inch (BPSI).

Being a two-dimensional measure, areal density is computed as the product of two other one-dimensional density measures: track density and linear recording density. Track density is a measure of how tightly the concentric tracks on the disk are packed, i.e., how many tracks can be placed down in inch of radius on the platters. Linear recording density is a measure of how tightly the bits are packed within a length of track.

Presently available write poles lack the ability to generate localized magnetic recording fields with the density required for future areal density goals. Smaller, more localized magnetic recording fields are important for minimizing the trackwidth. Narrowing of the recording track causes the recording magnetic field to leak. In order to prevent this leakage magnetic field from generation, in the conventional magnetic head, track end surfaces (side surfaces) of the magnetic poles are trimmed. However, even using this trimming method, the leakage magnetic field cannot be sufficiently suppressed at the track ends of the magnetic head but some magnetic field leaks through a recording gap layer made of non-magnetic insulating material.

One approach has been to form a non-magnetic conductive material member in contact with at least a part of the respective side surfaces of the upper magnetic pole layer and in contact with the lower magnetic pole layer. The eddy current flows not only within the magnetic poles as in the conventional magnetic head but also through the non-magnetic conductive material members that are formed in contact with the track end surfaces of the upper magnetic pole. Therefore, the leakage flux is reduced somewhat to increase the magnetic field passing through the recording gap layer. The non-magnetic material used was Cu, Al, Au or alloys thereof. However, these materials do not sufficiently focus the magnetic flux within the write gap.

It can be seen then that there is a need for a method and apparatus for providing improved flux focusing in a write head.

SUMMARY OF THE INVENTION

To overcome the limitations described above, and to overcome other limitations that will become apparent upon reading and understanding the present specification, the present invention discloses a method and apparatus for providing improved flux focusing in a write head.

The present invention solves the above-described problems by using a diamagnetic material to provide flux focusing in a storage device. An embodiment of the present invention includes diamagnetic. Another embodiment of the present invention includes diamagnetic material selected from a group consisting of graphite and bismuth.

A write head in accordance with the principles of the present invention includes a pair of write poles separated by a write gap and at least one layer of a diamagnetic material disposed proximate the write poles for focusing flux into a magnetic recording medium.

In another embodiment of the present invention, another write head is provided. This write head includes a pair of write poles separated by a write gap and at least one layer of a diamagnetic material selected from a group consisting of graphite and bismuth disposed proximate the write poles for focusing flux into a magnetic recording medium.

In another embodiment of the present invention, a magnetic recording system is provided. The magnetic storage system includes a write head, the write head including a pair of write poles separated by a write gap, a moveable magnetic recording medium disposed at a point proximate the write gap and at least one layer of diamagnetic material disposed proximate the write poles for focusing flux into the magnetic recording medium.

In another embodiment of the present invention, another magnetic recording system is provided. This magnetic storage system includes a write head, the write head including a pair of write poles separated by a write gap, a moveable magnetic recording medium disposed at a point proximate the write gap and at least one layer of diamagnetic material selected from a group consisting of graphite and bismuth disposed proximate the write poles for focusing flux into the magnetic recording medium.

In another embodiment of the present invention, a method for providing improved flux focusing in a magnetic storage device is provided. The method includes forming write poles for a write head, the write poles being formed about a write gap and forming, proximate to the write poles, at least one layer of diamagnetic material selected from a group consisting of graphite and bismuth for focusing the flux into a magnetic recording medium.

In another embodiment of the present invention, another method for providing improved flux focusing in a magnetic storage device is provided. This method includes forming write poles for a write head, the write poles being formed about a write gap and forming, proximate to the write poles, at least one layer of diamagnetic material for focusing the flux into a magnetic recording medium.

In another embodiment of the present invention, another write head is provided. This write head includes means for writing magnetic signals to the means for storing magnetic data and means, disposed proximate the means for writing, having a magnetic susceptibility substantially equal to or greater than $-1 \times 10^{-5}$ for focusing flux into a magnetic recording medium.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing improved flux focusing in a storage device. The present invention uses a diamagnetic material to provide flux focusing in a storage device. An embodiment of the present invention includes diamagnetic material having a magnetic susceptibility substantially equal to or greater than $-1 \times 10^{-5}$. Another embodiment of the present invention includes diamagnetic material selected from a group comprising graphite and bismuth.

Figure 1:
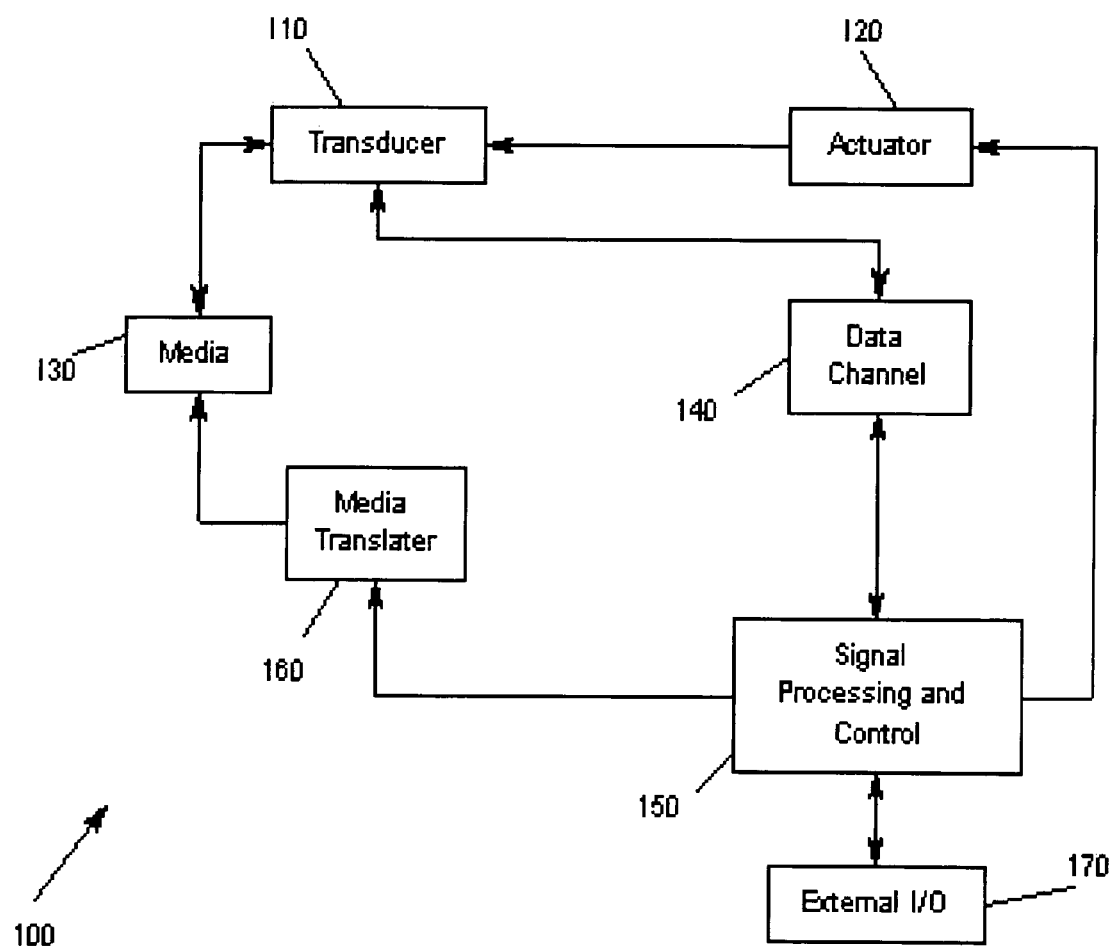
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
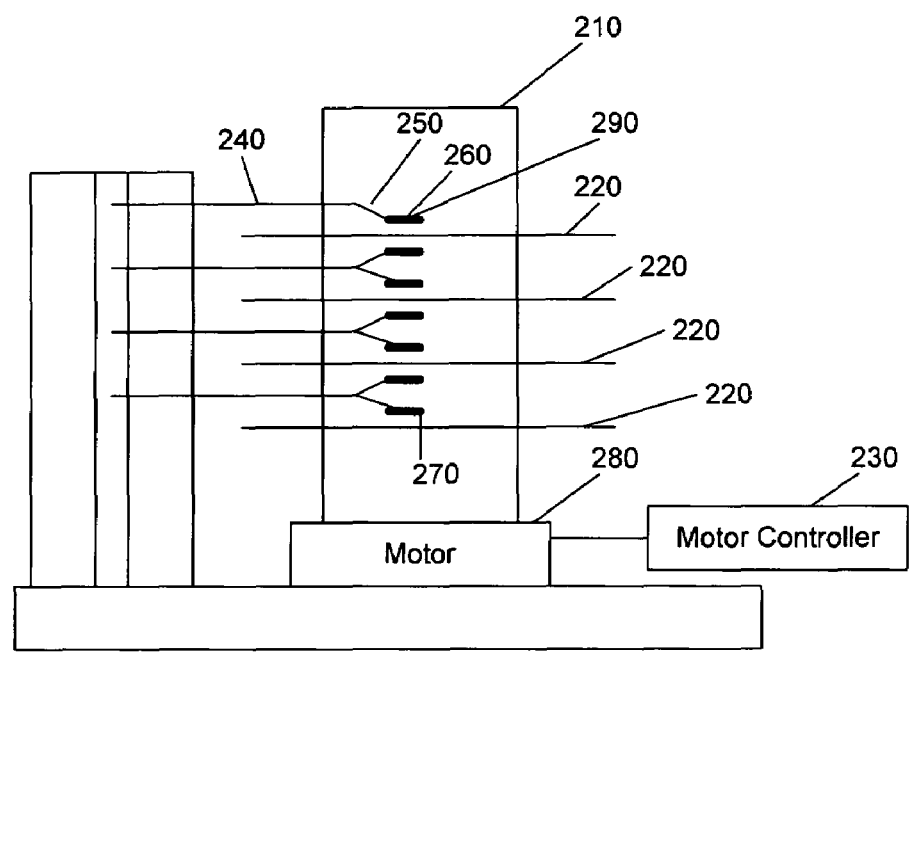
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is constructed on slider 260 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220.

When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

Figure 3:
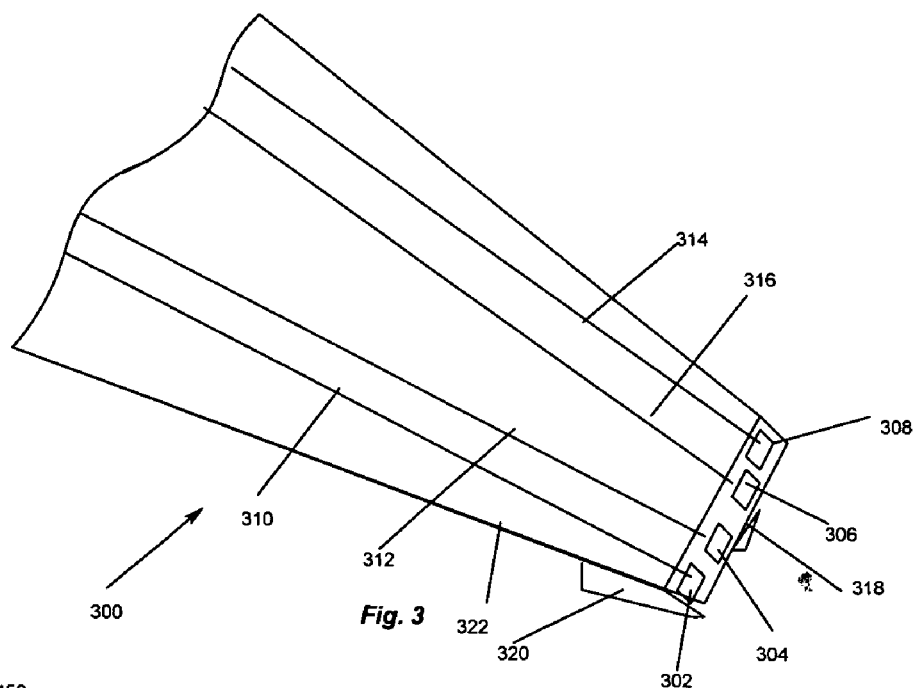
FIG. 3 illustrates a slider mounted on a suspension according to an embodiment of the present invention.

FIG. 3 illustrates a sensor assembly 300. In FIG. 3, a slider 320 is mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

Figure 4:
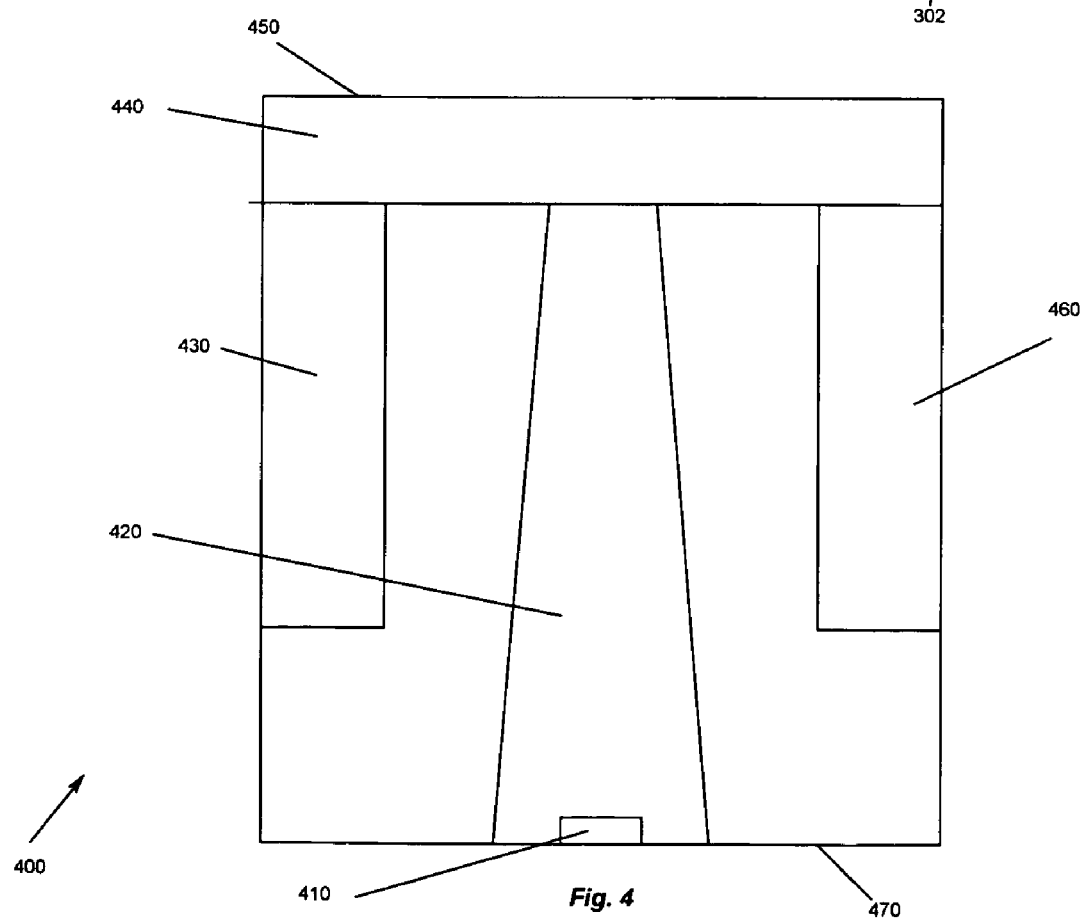
FIG. 4 illustrates an ABS view of the slider and the magnetic head according to an embodiment of the present invention.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1-4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives. Further, the structure of magnetic recording disk drive systems that implement embodiments of the present invention may vary from the description above without departing from the scope of embodiments of the present invention.

Figure 5:
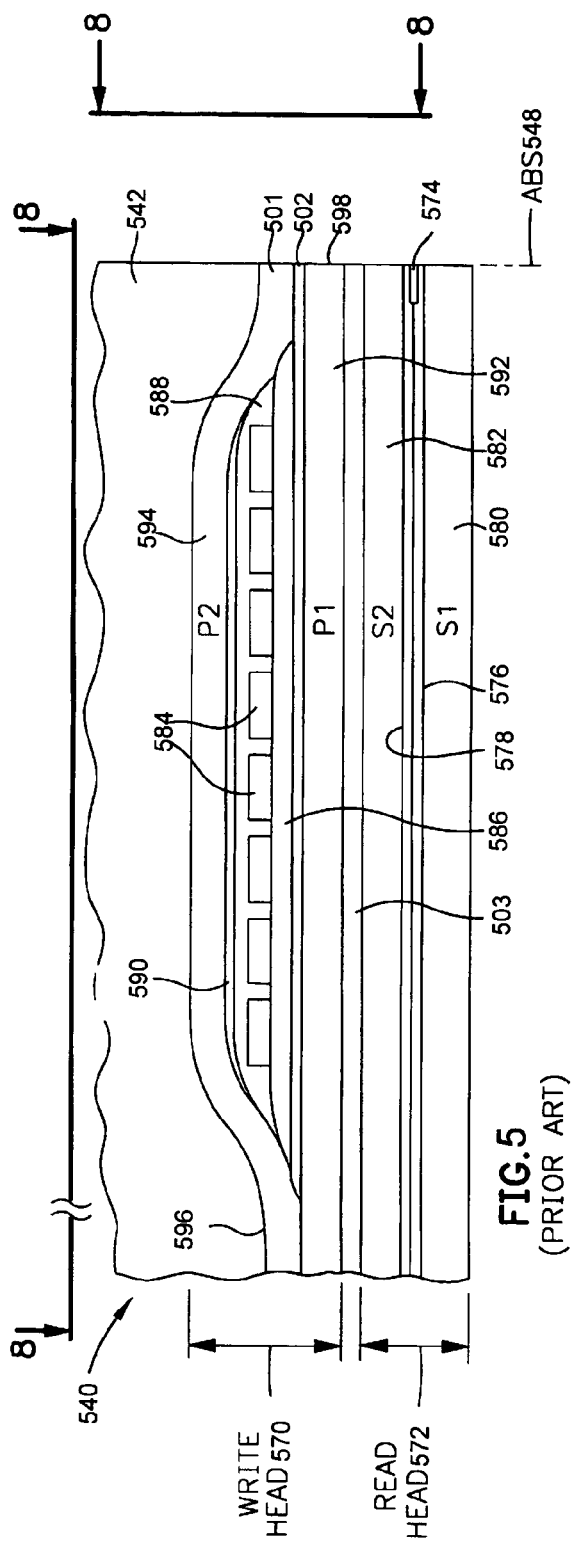
FIG. 5 is a side cross-sectional elevation view of a magnetic head.
Figure 7:
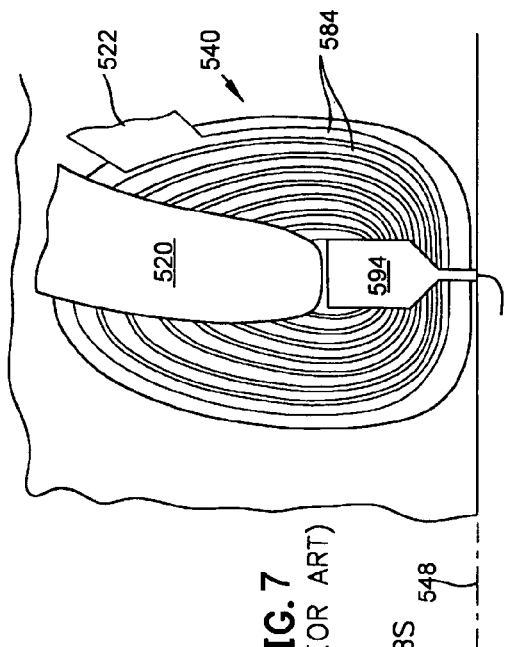
FIG. 7 illustrates the connect leads coupled to the coil for the write pole piece.
Figure 6:
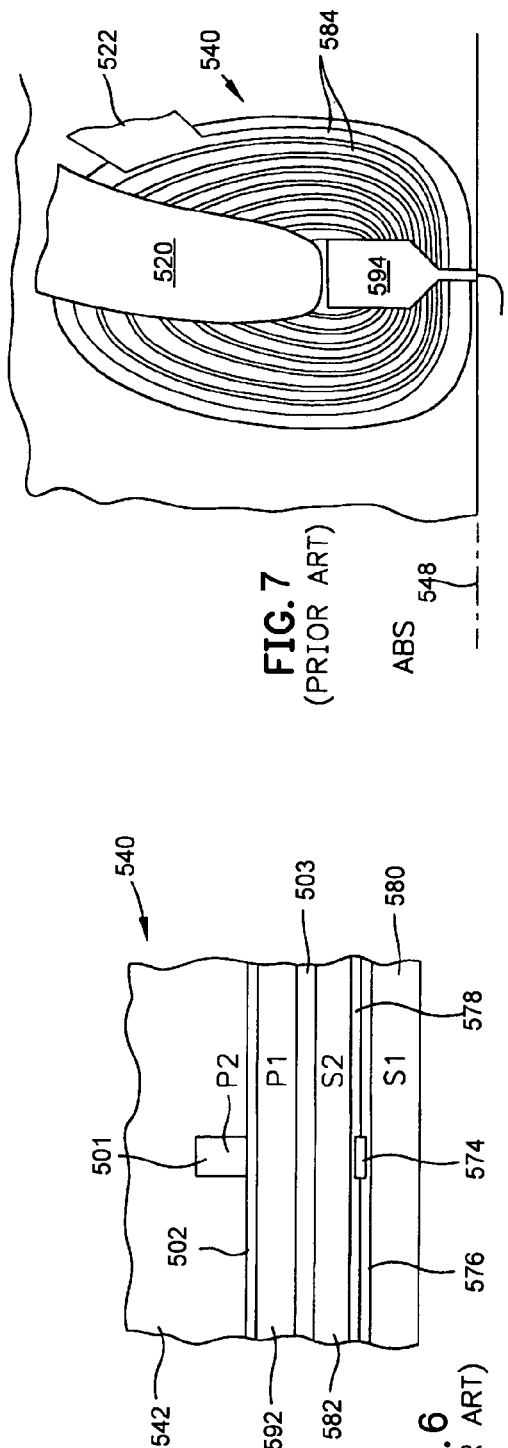
FIG. 6 is an air bearing surface (ABS) view of the magnetic head of FIG. 5.

FIG. 5 is a side cross-sectional elevation view of a magnetic head 540. Note that FIG. 5 does not show the details of the pole tip region. The magnetic head 540 includes a write head portion 570 and a read head portion 572. The read head portion 572 includes a sensor 574. FIG. 6 is an ABS view of the magnetic head of FIG. 5. FIG. 7 illustrates a view of the connect leads 520, 522 coupled to the coil 584 for the write pole piece 594. The sensor 574 is sandwiched between first and second gap layers 576 and 578 proximate the air bearing surface (ABS) 548, and the gap layers 576, 578 are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current is conducted through the sensor causes these resistance changes to be manifested as voltage changes. These voltage changes are then processed as readback signals by the signal processing system 150 shown in FIG. 1.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS. The first pole piece layer 592 is separated from the second shield layer 582 by an insulation layer 503.

As discussed above, presently available write poles lack the ability to generate localized magnetic recording fields with the density required for future areal density goals. According to an embodiment of the present invention, diamagnetic material having a high magnetic susceptibility, such as graphite and bismuth, is used to provide flux focusing in a storage device. An embodiment of the present invention has a magnetic susceptibility higher than $-1 \times 10^{-5}$.

Figure 8:
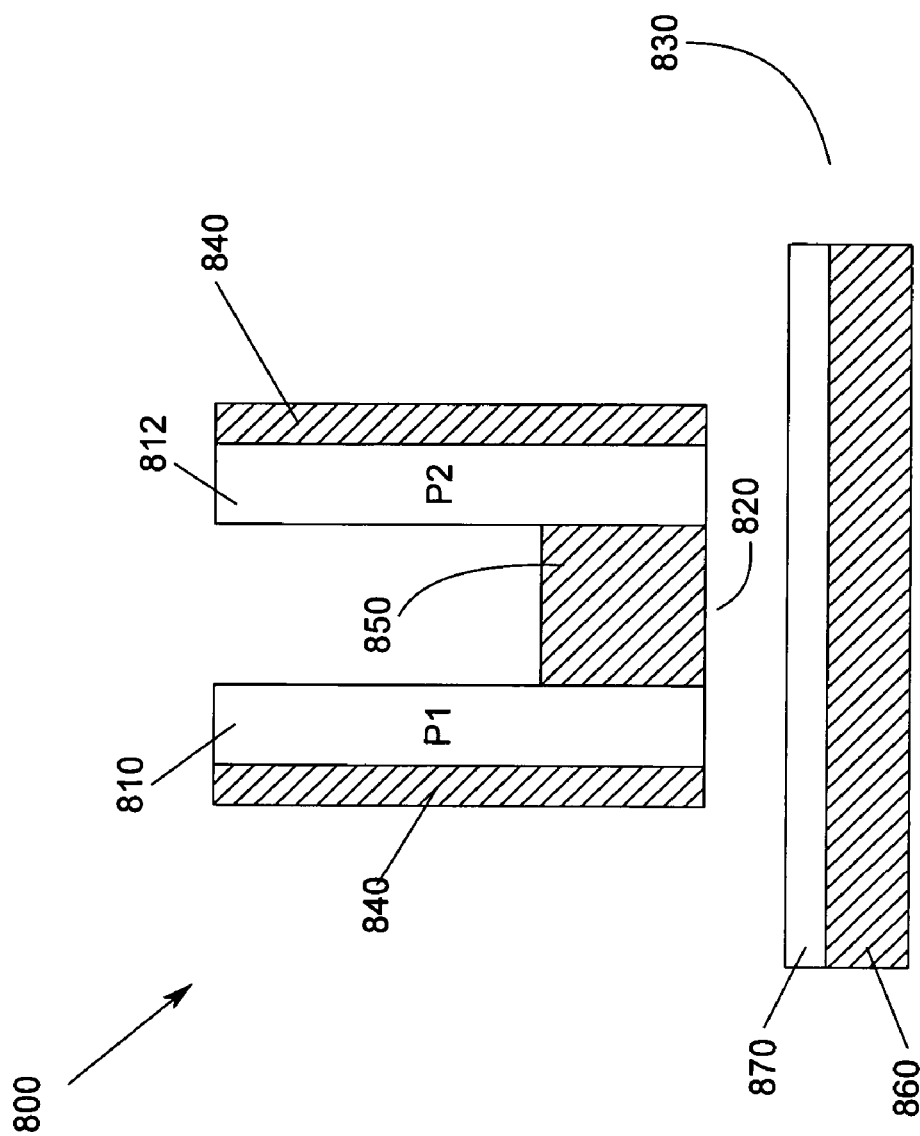
FIG. 8 illustrates a more details view of a write head according to an embodiment of the present invention.

FIG. 8 illustrates a more details view of a write head 800 according to an embodiment of the present invention. In FIG. 8, write head 800 includes "magnetically soft" pole pieces 810, 812. The pole pieces 810, 812 are separated by a small non-magnetic gap 820. A write current magnetizes the pole pieces 810, 812 to generate magnetic flux into the recording medium 830 and across the gap 820. To better focus the magnetic flux into the magnetic recording medium 830 and across the gap 820, a high susceptibility diamagnetic material 840 is disposed on the sides of the write poles 810, 812. The high susceptibility diamagnetic material 840 improves the definition of the track width during recording of data on the magnetic recording medium 830 by reducing the fringing magnetic field at the sides of the gap 820.

When different materials are exposed to an external magnetic field, they are magnetized depending on its magnetic susceptibility. Magnetic susceptibility is the ratio of the magnetization induced in a material to the magnetic field applied to the material. All materials exhibit magnetism when exposed to an externally applied magnetic field.

Materials may be classified by their response to an externally applied magnetic field as diamagnetic, paramagnetic, or ferromagnetic. Diamagnetic metals have a very weak and negative susceptibility to magnetic fields. Diamagnetic materials are slightly repelled by a magnetic field and the material does not retain the magnetic properties when the external field is removed. Diamagnetic materials have no permanent net magnetic moment.

While many elements in the periodic table, including copper, silver, and gold, are diamagnetic, their magnetic susceptibility differs. For example, the magnetic susceptibility of copper is $-0.85 \times 10^{-6}$ and the magnetic susceptibility of gold is $-2.7 \times 10^{-6}$. The magnetic susceptibility of diamond-like carbon (DLC) is approximately $-1.0 \times 10^{-6}$.

In contrast, graphite has a magnetic susceptibility of $-4.5 \times 10^{-4}$, which is two orders of magnitude higher. Therefore, embodiments of the present invention include high susceptibility diamagnetic materials for the diamagnetic flux guide 840. The flux guide 840 relies on the orbital diamagnetism, which works at room temperature, e.g., approximately 21-23° Celsius, and is not limited by any critical field.

FIG. 8 also shows the write head 800 having a gap layer 850 of a high susceptibility diamagnetic materials disposed in the gap 820 between the write poles 810. 812. In fact, the implementation of the gap layer 850 of a high susceptibility diamagnetic materials in the gap 820 is more effective than application of the flux guide 840 of high susceptibility diamagnetic materials at the sides of the poles 810, 812 alone. Still further, an underlayer 860 of high susceptibility diamagnetic materials may also be disposed under the recording surface 870 of the recording medium 830. While, FIG. 8 shows a flux guide 840 of high susceptibility diamagnetic materials disposed at the sides of the poles 810, 812, a gap layer 850 of high susceptibility diamagnetic materials in the gap 820 and an underlayer 860 of high susceptibility diamagnetic materials disposed underneath the recording surface 870, those skilled in the art will recognize that a storage system according to embodiments of the present invention may be implemented with any combination of the layers of high susceptibility diamagnetic materials.

Figure 9:
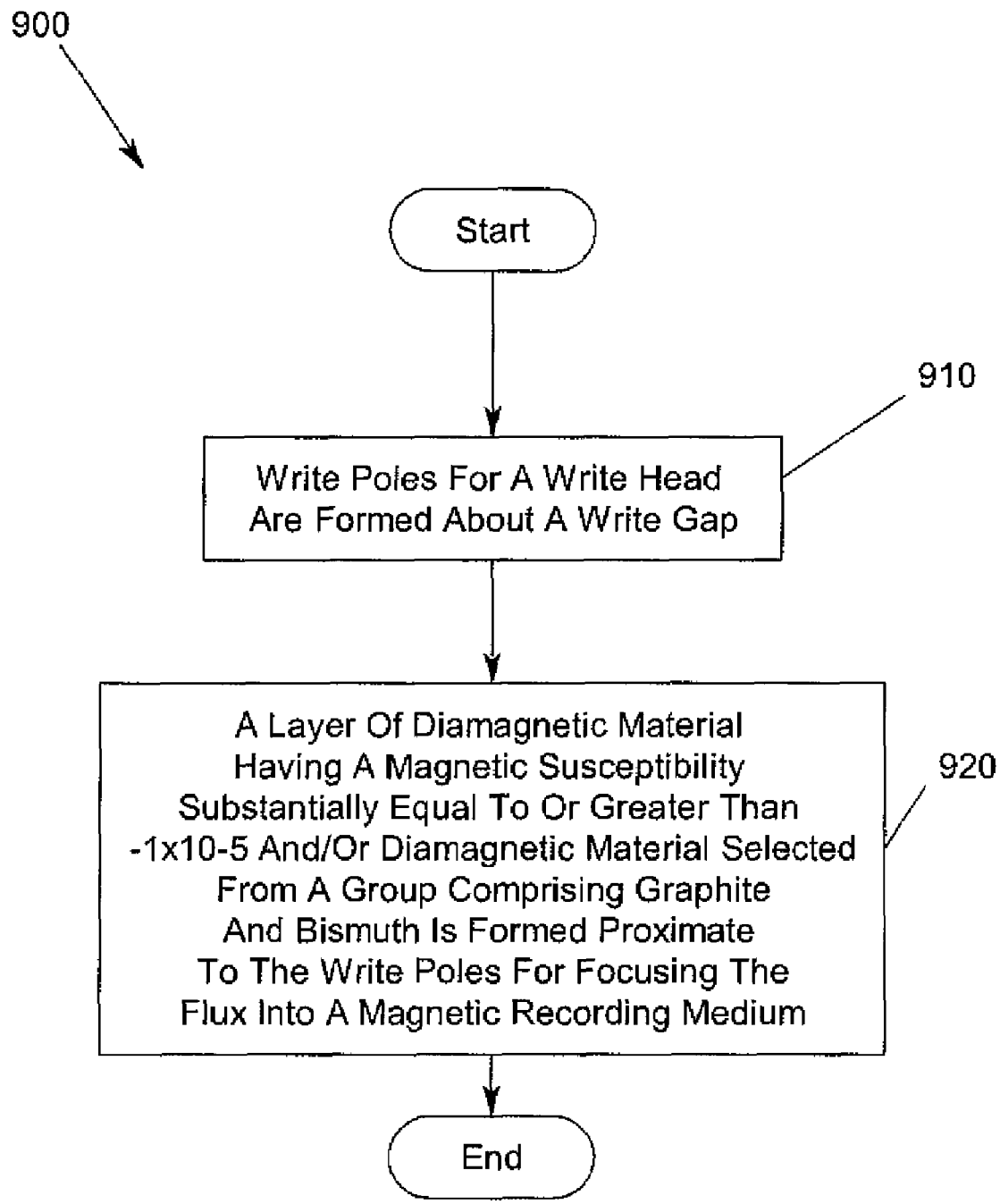
FIG. 9 is a flow chart of a method for providing diamagnetic flux focusing in a storage device according to an embodiment of the present invention.

FIG. 9 is a flow chart 900 of a method for providing diamagnetic flux focusing in a storage device according to an embodiment of the present invention. In FIG. 9, write poles for a write head are formed about a write gap 910. A layer of diamagnetic material having a magnetic susceptibility substantially equal to or greater than $1\times10^{-5}$ and/or diamagnetic material selected from a group comprising graphite and bismuth is formed proximate to the write poles for focusing the flux into a magnetic recording medium 920. The layer may include a flux guide disposed at the sides of the poles, a gap layer in the gap or an underlayer disposed underneath the recording surface of the recording medium.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A write head, comprising:
a pair of substantially planar, thin film write poles formed with a straight length of write pole material, wherein the length of the thin film write poles is transverse to an air-bearing surface, the pair of write poles being separated by a write gap and having pole tips with ends substantially parallel to and facing the air-bearing surface; and
diamagnetic material disposed proximate the pole tips of the write poles for focusing flux into a magnetic recording medium, wherein the diamagnetic material is formed in-line with the write poles and contacts both of the write poles;
wherein the diamagnetic material further forms a flux guide adjacent to and extending the length of the sides of the write poles opposite to the write gap.

2. The write head of claim 1, wherein the diamagnetic material comprises a gap layer disposed in the write gap, wherein the write gap is formed only of the diamagnetic material.

3. A write head, comprising:
a pair of substantially planar, thin film write poles formed with a straight length of write pole material, wherein the length of the thin film write poles is transverse to an air-bearing surface, the pair of write poles being separated by a write gap and having pole tips with ends substantially parallel to and facing the air-bearing surface; and
diamagnetic material selected from a group consisting of graphite and bismuth disposed proximate the pole tips of the write poles adjacent to and extending the length of the sides of the write poles outside the write gap so that a pole tip is in-line with and between the diamagnetic material and the write gap for focusing flux into a magnetic recording medium.

4. The write head of claim 3, wherein the diamagnetic material selected from the group consisting of graphite and bismuth comprises a flux guide disposed adjacent and in contact with sides of the write poles.

5. A magnetic recording system, comprising:
a write head, the write head including a pair of substantially planar, thin film write poles formed with a straight length of write pole material, wherein the length of the thin film write poles is transverse to an air-bearing surface, the pair of write poles being separated by a write gap and having pole tips with ends substantially parallel to and facing the air-bearing surface;
a moveable magnetic recording medium disposed at a point proximate the write gap; and
diamagnetic material disposed proximate the pole tips of the write poles adjacent to and extending the length of the sides of the write poles outside the write gap so that a pole tip is in-line with and between the diamagnetic material and the write gap for focusing flux into a magnetic recording medium.

6. The magnetic recording system of claim 5 wherein the diamagnetic material comprises a flux guide disposed adjacent and in contact with sides of the write poles.

7. The magnetic recording system of claim 5, further comprising diamagnetic material formed as an underlayer disposed beneath a recording surface of the magnetic recording medium.

8. A magnetic recording system, comprising:
a write head, the write head including a pair of substantially planar, thin film write poles formed with a straight length of write pole material, wherein the length of the thin film write poles is transverse to an air-bearing surface, the pair of write poles being separated by a write gap and having pole tips with ends substantially parallel to and facing the air-bearing surface; and
a moveable magnetic recording medium disposed at a point proximate the write gap; and
at least one layer of diamagnetic material selected from a group consisting of graphite and bismuth disposed proximate the pole tips of the write poles adjacent to and extending the length of the sides of the write poles outside the write gap so that a pole tip is in-line with and between the diamagnetic material and the write gap for focusing flux into a magnetic recording medium.

9. The magnetic recording system of claim 8, wherein the diamagnetic material selected from the group consisting of graphite and bismuth comprises a flux guide disposed adjacent to sides of the write poles opposite to the write gap.

10. The magnetic recording system of claim 8, further comprising diamagnetic material selected from the group consisting of graphite and bismuth formed as an underlayer disposed beneath a recording surface of the magnetic recording medium.

11. A method for providing improved flux focusing in a magnetic storage device, comprising:
forming a pair of substantially planar, thin film write poles with a straight length of write pole material, wherein the length of the thin film write poles is transverse to an air-bearing surface, the pair of write poles being separated by a write gap and having pole tips with ends substantially parallel to and facing the air-bearing surface; and
forming diamagnetic material selected from a group consisting of graphite and bismuth for focusing the flux into a magnetic recording medium, wherein the diamagnetic material is formed proximate to the pole tips of the write poles adjacent to and extending the length of the sides of the write poles outside the write gap so that the pole tips are in-line with and between the diamagnetic material and the write gap.

12. The method of claim 11, wherein the forming at least one layer of diamagnetic material selected from the group consisting of graphite and bismuth further comprises forming a flux guide adjacent to and in contact with sides of the write poles.

13. The method of claim 11 further comprising diamagnetic material selected from the group consisting of graphite and bismuth formed as an underlayer disposed beneath a recording surface of the magnetic recording medium.

14. A method for providing improved flux focusing in a magnetic storage device, comprising:
   forming a pair of substantially planar, thin film write poles with a straight length of write pole material, wherein the length of the thin film write poles is transverse to an air-bearing surface, the pair of write poles being separated by a write gap and having pole tips with ends substantially parallel to and facing the air-bearing surface; and
   forming diamagnetic material for focusing the flux into a magnetic recording medium, wherein the diamagnetic material is formed proximate to the pole tips of the write poles adjacent to and extending the length of the sides of the write poles outside the write gap so that the pole tips are in-line with and between the diamagnetic material and the write gap.

15. The method of claim 14, wherein the forming the diamagnetic material further comprises forming a flux guide adjacent to and in contact with sides of the write poles.

16. The method of claim 14 further comprising forming diamagnetic material as an underlayer disposed beneath a recording surface of the magnetic recording medium.

17. A write head, comprising:
   substantially planar, thin film means for writing magnetic signals to means for storing magnetic data, the substantially planar, thin film means for writing magnetic signals having a length transverse to an air-bearing surface and pole tips with ends substantially parallel to and facing the air-bearing surface;
   means for forming a gap between the substantially planar, thin film means for writing magnetic signals; and
   diamagnetic means, disposed proximate the pole tips of the substantially planar, thin film means for writing magnetic signals and adjacent to and extending the length of the sides of the thin film means for writing magnetic signals outside the means for forming the gap so that means for writing is in-line with and between the diamagnetic means and the means for forming the gap, for focusing flux into a magnetic recording medium.

* * * * *

UNITED STATES PATENT AND TRADEMARK OFFICE
CERTIFICATE OF CORRECTION

| | |
|---|---|
| PATENT NO. | : 7,538,977 B2 |
| APPLICATION NO. | : 10/837279 |
| DATED | : May 26, 2009 |
| INVENTOR(S) | : Gider et al. |

It is certified that error appears in the above-identified patent and that said Letters Patent is hereby corrected as shown below:

Title page, (73) Assignee: "Technologies B.V., Amsterdam" should read --Technologies Netherlands B.V., Amsterdam--

Signed and Sealed this

Ninth Day of November, 2010

David J. Kappos
*Director of the United States Patent and Trademark Office*